United States Patent
Berke et al.

(10) Patent No.: US 11,137,818 B2
(45) Date of Patent: Oct. 5, 2021

(54) SYSTEM AND METHOD FOR VARIABLE INPUT OUTPUT VOLTAGE ON DIFFERENT CHANNELS FOR INCREASING POWER EFFICIENCY

(71) Applicant: DELL PRODUCTS, LP, Round Rock, TX (US)

(72) Inventors: Stuart Allen Berke, Austin, TX (US); Bhyrav M. Mutnury, Austin, TX (US); Douglas S. Winterberg, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/804,784

(22) Filed: Feb. 28, 2020

(65) Prior Publication Data

US 2021/0271311 A1 Sep. 2, 2021

(51) Int. Cl.
*G06F 1/3234* (2019.01)
*G06F 13/16* (2006.01)

(52) U.S. Cl.
CPC ........ *G06F 1/3253* (2013.01); *G06F 13/1668* (2013.01)

(58) Field of Classification Search
CPC .......................... G06F 1/3253; G06F 13/1668
USPC ......................................................... 713/320
See application file for complete search history.

(56) References Cited

U.S. PATENT DOCUMENTS

| 9,509,532 | B2 | 11/2016 | Berke et al. |
| 9,606,598 | B2 * | 3/2017 | Luo ....................... G06F 16/245 |
| 10,298,421 | B2 | 5/2019 | Berke et al. |
| 10,860,505 | B1 * | 12/2020 | Mutnury .................. H04B 1/06 |
| 2004/0044808 | A1 * | 3/2004 | Salmon ............... G06F 13/4072 710/8 |
| 2010/0135097 | A1 * | 6/2010 | Berke .................... G11C 5/147 365/226 |
| 2018/0321845 | A1 | 11/2018 | Mutnury et al. |

* cited by examiner

*Primary Examiner* — Brian T Misiura
(74) *Attorney, Agent, or Firm* — Larson Newman, LLP

(57) ABSTRACT

An information handling system includes a control processing unit (CPU) including a dual in-line memory module (DIMM) controller and hosting a basic input output system (BIOS). A first and a second set of DIMMs are connected to the CPU through the DIMM controller and by a first communication channel and a second communication channel, respectively. Each DIMM in the first and second set of DIMMs may be configured by the BIOS to include a unique data bus IO voltage ($V_{ddq}$) setting for bidirectional communications with the CPU.

20 Claims, 10 Drawing Sheets

SYSTEM AND METHOD FOR VARIABLE INPUT OUTPUT VOLTAGE ON DIFFERENT CHANNELS FOR INCREASING POWER EFFICIENCY

FIELD OF THE DISCLOSURE

This disclosure generally relates to information handling systems, and more particularly relates to variable input output voltage on different channels for increasing power efficiency.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data memory systems, and networking systems.

SUMMARY

An information handling system may include a processing unit with a dual in-line memory module (DIMM) controller where the processing unit is configured to host a basic input output system (BIOS). A first set of DIMMs and a second set of DIMMs are connected to the DIMM controller by a first communication channel and a second communication channel, respectively. The BIOS may be configured to provide a unique data bus input output voltage ($V_{ddq}$) setting for bidirectional communications between each DIMM in the first and second set of DIMMs and the processing unit. Based on the provided unique $V_{ddq}$ setting, the DIMM controller can be configured to supply a particular amount of $V_{ddq}$ to each DIMM in the first and second set of DIMMs.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
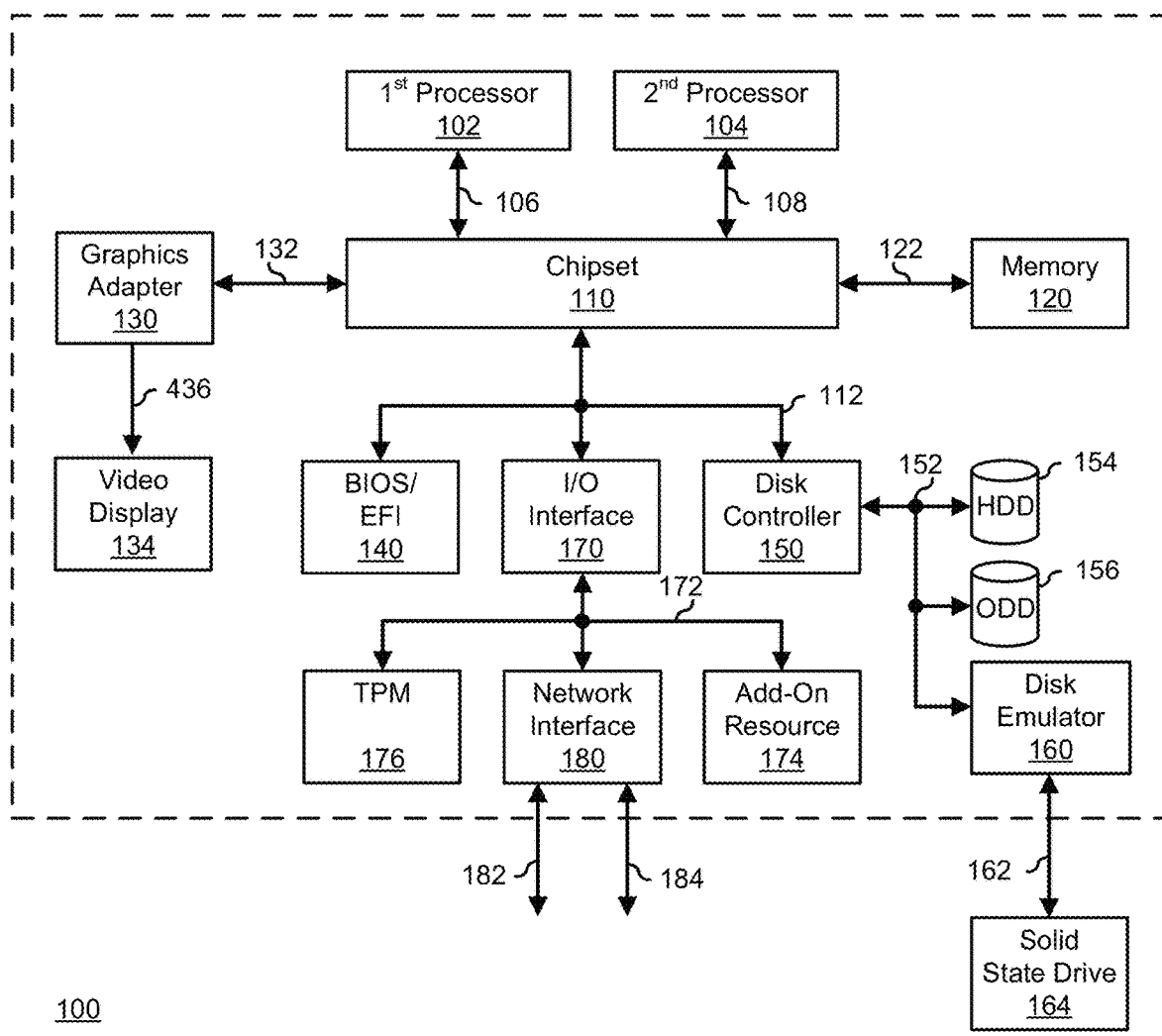
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a processor system which may be a System-on-a-Chip (SoC), a personal computer, a laptop computer, a smart phone, a tablet device or other consumer electronic device, storage array, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as an SoC, or other control logic hardware. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above. Information handling system 100 includes processors 102 and 104, a chipset 110, a memory 120, a graphics adapter 130, a basic input and output system/extensible firmware interface (BIOS/EFI) module 140, a disk controller 150, a disk emulator 160, an I/O interface 170, and a network interface 180. Processor 102 is connected to chipset 110 via processor interface 106, and processor 104 is connected to the chipset via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer System Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) interface such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a trusted platform module (TPM) 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics adapter, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand™ channels, Fibre Channel channels, Gigabit Ethernet channels, proprietary channel architectures, or a combination thereof. Network channels 182 and 184 can be connected to external network resources (not illustrated). The network resource can include another information handling system, a data, another network, a grid management system, another suitable resource, or a combination thereof.

For the purposes of this disclosure, an example information handling system is a server. The server in turn may include other information handling systems. An example information handling system in a server may be a CPU device including a CPU in communication with one or more memory devices, such as DIMMs. A DIMM is a memory device for data storage that includes a series of dynamic random-access memory (DRAM) integrated circuits. There has been a proliferation of the number of individual DIMMs supported by the CPU. As a result, there has been an increase in the connection length across sets of DIMMs such that the CPU to DIMM connection length increasingly varies. In addition, communication speeds between CPUs and DIMMs are increasing, increasing the difficulty of data transfer due to consequent problems with signal acquisition between DIMM and CPU.

Furthermore, there is also variance among DIMMs because different DIMMs may be manufactured by different manufacturers and used in a single information handling system or model of information handling system. For example, to differentiate DIMMs, DIMM manufacturers sometimes go beyond a DIMM specification to design DIMMs. This could be in terms of raw card improvement or printed circuit board (PCB) material improvement or silicon process improvement, for example. This is usually evident from the laboratory testing on DIMM products. For a given DIMM capacity and rank type, a DIMM manufactured by one DIMM manufacturer is better or a DIMM manufactured by another DIMM manufacturer is worse.

To communicate with DIMMs across all the above variances, default values for data bus IO voltage ($V_{ddq}$) has changed from 1.5V at DDR3 to 1.2V at DDR4 to 1.1V at DDR5 and this reduction is partially driven by a need to reduce power consumption in the server. The $V_{ddq}$ may include the voltage used by signals on the memory bus. However, even though some DIMMs may be in close physical proximity with a host memory controller and some DIMM routings are far from the host memory controller, the $V_{ddq}$ for each of the DIMMs in the dual data rate channels have remained the same. Furthermore and in some cases, the $V_{ddq}$ for each of the DIMMs is tied up with another voltage in a logic core circuitry such that the $V_{ddq}$ is referenced to the voltage in the logic core circuitry.

Figure 2:
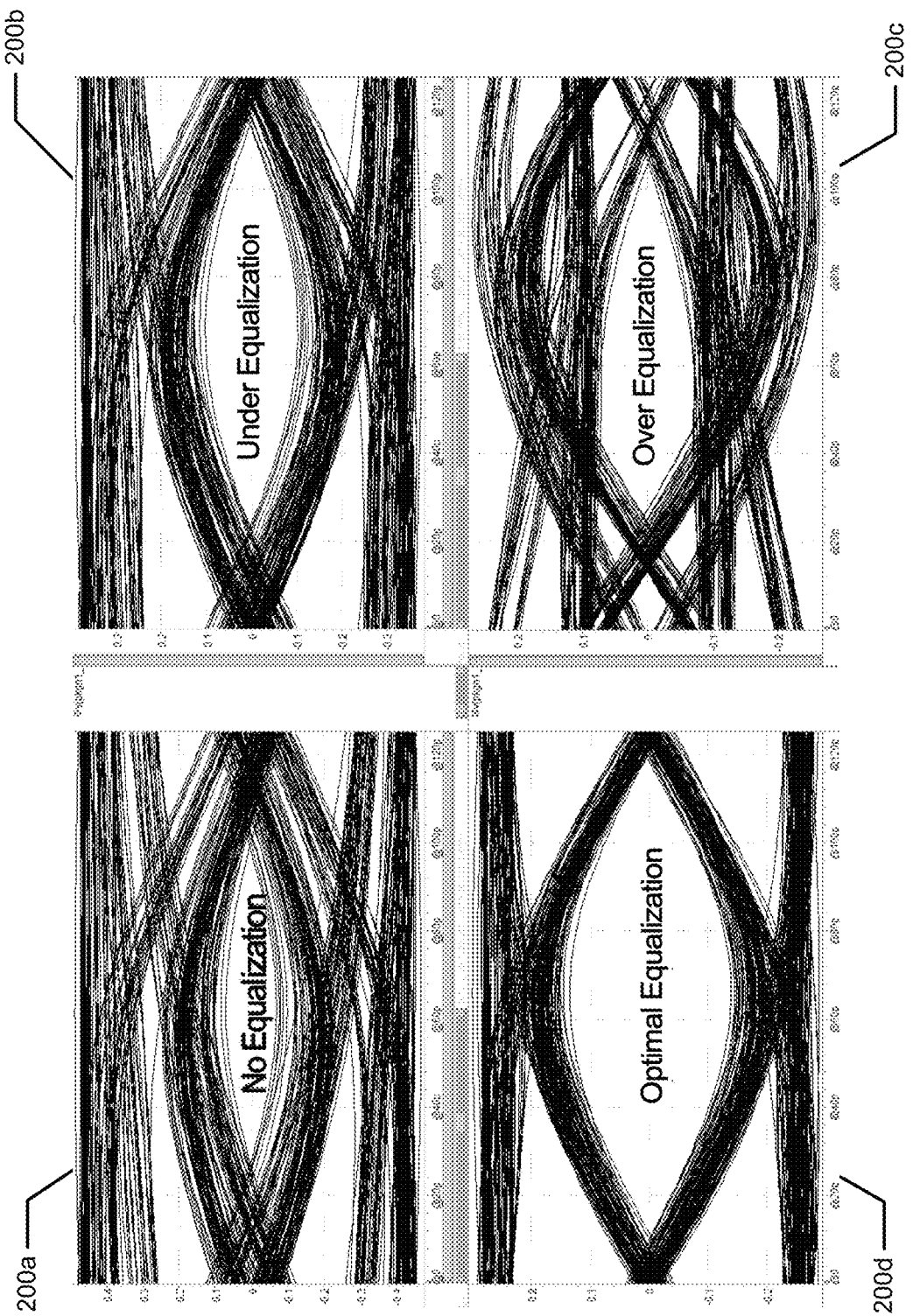
FIG. 2 illustrates a set of eye diagrams for different channel equalizations according to an embodiment of the present disclosure.

FIG. 2 shows a set of plots 200a-200d indicating various eye diagrams for equalization between a CPU and individual DIMM. In plot 200a, there is no equalization of the communication channel between the CPU and DIMM, and the eye diagram shows a small squinting eye suboptimal for signal acquisition. In plot 200b, there is under equalization of the communication channel between the CPU and DIMM, and the eye diagram shows a small eye suboptimal for signal acquisition. In plot 200c, there is over equalization of the communication channel between the CPU and DIMM, and the eye diagram shows a compressed eye suboptimal for signal acquisition. In plot 200d, there has been an optimized equalization of the communication channel between CPU and DIMM, and the eye diagram shows a wide eye optimal for signal acquisition. In an embodiment, the optimized equalization in plot 200d may be implemented with enhanced power efficiency. The enhanced power efficiency, for example, may include a transmitter module that uses variable amount of $V_{ddq}$ based upon a trace length of the communication channel between the transmitter module and a receiving module. In this example, the variable amount of $V_{ddq}$ may be used as a leverage to increase the power efficiency while maintaining the eye diagram of the plot 200d.

Figure 3:
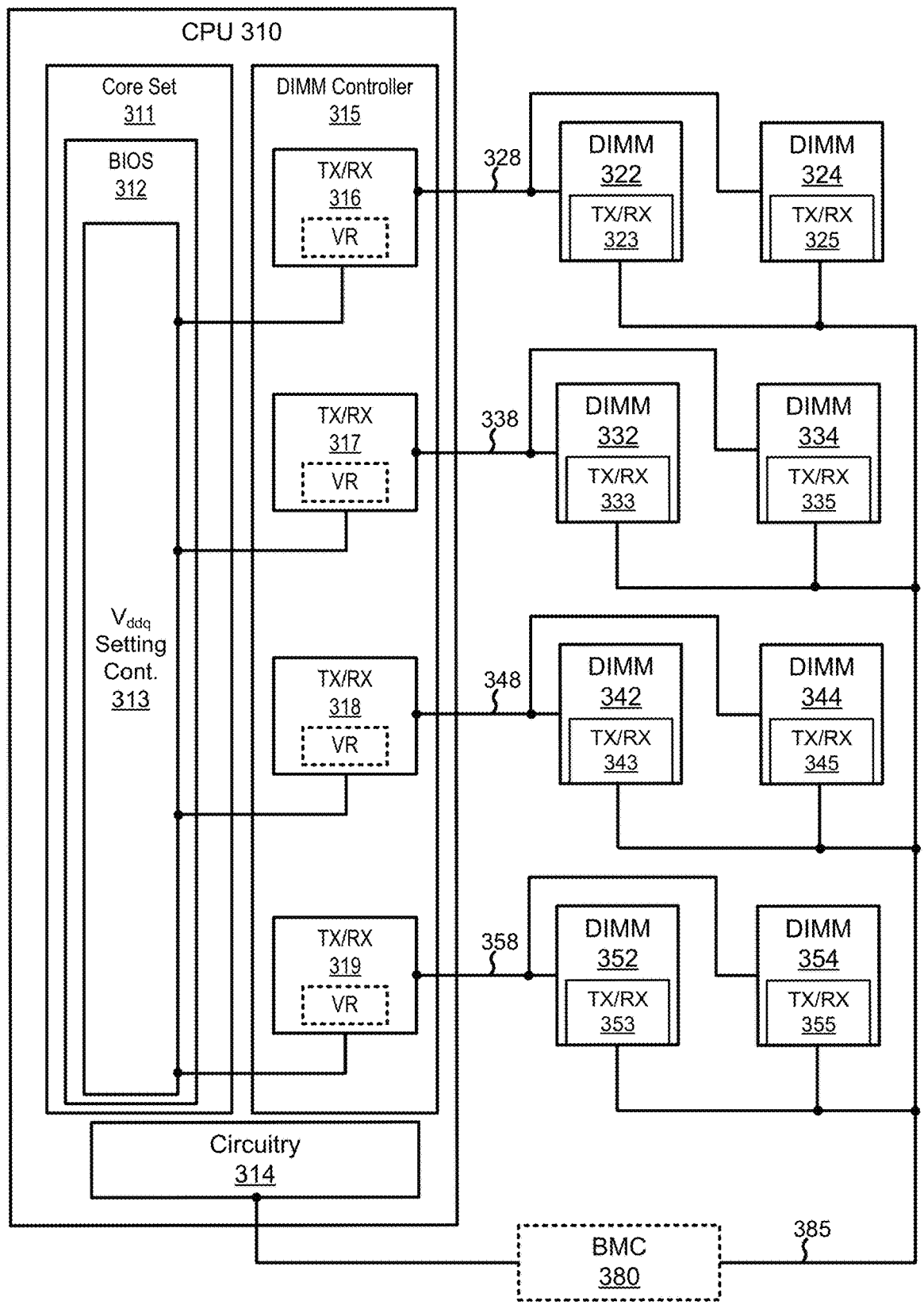
FIG. 3 illustrates an information handling system including a memory system according to an embodiment of the present disclosure.

An example CPU DIMM memory system 300 is shown in FIG. 3. System 300 includes a CPU 310 including a core set 311 which is the set of processor cores of CPU 310. One or more processor cores of the core set 311 may host a BIOS 312 that includes a $V_{ddq}$ setting controller 313. The BIOS is firmware that can be used to perform hardware initialization during the booting process and provides an abstraction layer for the hardware. CPU 310 includes a CPU circuitry 314 and a memory controller such as a DIMM controller 315. DIMM controller 315 includes a first transceiver component (TX/RX) 316, a second TX/RX 317, a third TX/RX 318, and a fourth TX/RX 319 that may receive $V_{ddq}$ initialization settings from the $V_{ddq}$ setting controller 313. The first TX/RX 316 may perform bidirectional communications with a DIMM 322 and/or a DIMM 324 over the same first communication channel 328. The second TX/RX 317 may perform bidirectional communications with a DIMM 332 and/or a DIMM 334 through a second communication channel 338. The third TX/RX 318 may perform bidirectional communications with a DIMM 342 and/or a DIMM 344 through a third communication channel 348. The fourth TX/RX 319 may perform bidirectional communications with a DIMM 352 and/or a DIMM 354 through a fourth communication channel 358. Each one of the DIMMs 322, 324, 332, 334, 342, 344, 352, and 354 may include TX/RXs 323, 325, 333, 335, 343, 345, 353, and 355, respectively. Furthermore, each one of the DIMMs may be connected to a server baseboard management controller (BMC) 380 through a channel link 385. The BMC 380 is connected to the CPU 310 through the circuitry 314.

During bidirectional communications between the DIMM controller TX/RX and the corresponding associated DIMM or DIMMs that the TX/RX support, a voltage supply regulator (VR) in each DIMM controller TX/RX may be configured to supply an optimized amount of $V_{ddq}$ to be used for data transmission. The $V_{ddq}$ setting controller 313 may set the optimized amount of $V_{ddq}$ to be supplied by each VR. In this case, the VR in each DIMM controller TX/RX may supply the desired $V_{ddq}$ to the DIMM controller TX/RX and to the TX/RX of each DIMM that may be associated with the DIMM controller TX/RX. For example, the DIMM controller first TX/RX 316 transmits data to the DIMM 322 and the DIMM 322 sends back data to the first TX/RX 316 using the same first communication channel 328. In this example, the $V_{ddq}$ setting controller 313 may set the VR of the first TX/RX 316 to supply the desired $V_{ddq}$ to be used by the first TX/RX 316 and the TX/RX 323 of the DIMM 322 for the bidirectional communication. In another example, the DIMM controller second TX/RX 317 transmits data to the DIMM 334 and the DIMM 334 sends back data to the second TX/RX 317 through the second communication channel 338. In this other example, the $V_{ddq}$ setting controller 313 may set the VR of the second TX/RX 317 to supply the desired $V_{ddq}$ to be used by the second TX/RX 317 and the TX/RX 335 of the DIMM 334 for the bidirectional communication, and so on. In these examples, the desired amount of $V_{ddq}$ may be based upon a predetermined trace length of the connecting communication channel, equalization settings of TX/RX, or a combination thereof.

In another embodiment, each one of the first TX/RX 316, second TX/RX 317, third TX/RX 318, and fourth TX/RX 319 may include a dedicated VR to support a particular associated DIMM. For example and for the DIMMs 322 and 324 that are associated with the first TX/RX 316 through the first communication channel 328, the first TX/RX 316 may include a first VR and a second VR. The first VR may be configured to supply desired voltages for bidirectional communications between the DIMM controller 315 and the DIMM 322 while the second VR can be set to supply the necessary voltages for bidirectional communications between the DIMM controller 315 and the DIMM 324. In another example and for the DIMMs 332 and 334 that are associated with the second TX/RX 317 through the second communication channel 338, the second TX/RX 317 may include a third VR and a fourth VR. The third VR may be configured to supply desired voltages for bidirectional communications between the DIMM controller 315 and the DIMM 332 while the fourth VR can be set to supply the necessary voltages for bidirectional communications between the DIMM controller 315 and the DIMM 334, and so on.

In another embodiment, each one of the DIMMs 322, 324, 332, 334, 342, 344, 352, and 354 may also include its own VR or a power management integrated circuit (PMIC) controller. In this case, the $V_{ddq}$ setting controller 313 may not only set the VR at the DIMM controller TX/RX but the $V_{ddq}$ setting controller 313 can also configure the VR or the PMIC at the corresponding associated DIMM. For example, the DIMM controller first TX/RX 316 transmits data to the DIMM 322, and the DIMM 322 sends back data to the first TX/RX 316 using the same first communication channel 328. In this example, the $V_{ddq}$ setting controller 313 may set the VR of the first TX/RX 316 to supply the desired $V_{ddq}$ to be used by the first TX/RX 316. Furthermore, the $V_{ddq}$ setting controller 313 may set the separate VR or PMIC at the TX/RX 323 of the DIMM 322 for the bidirectional communication. In this case, each DIMM in the system 300 may be configured to include a unique $V_{ddq}$ setting that can be supplied independently by its own VR.

When the memory system 300 is part of a server, the BMC 380 may be connected to a DIMM serial presence detect (SPD) hub of each one of the DIMMs 322, 324, 332, 334, 342, 344, 352, and 354. The SPD hub may provide DIMM information that includes IO voltage rating, loading capacity, DIMM type, and other DIMM properties information. The BMC 380 may access the SPD information and provide the obtained SPD information to the CPU 310 and particularly, the BIOS 312. With the obtained SPD information, the BIOS 312 through the BMC 380 and/or the DIMM controller 315 may configure the unique $V_{ddq}$ setting for each one of the DIMM controller TX/RX and the DIMM TX/RX.

Figure 4:
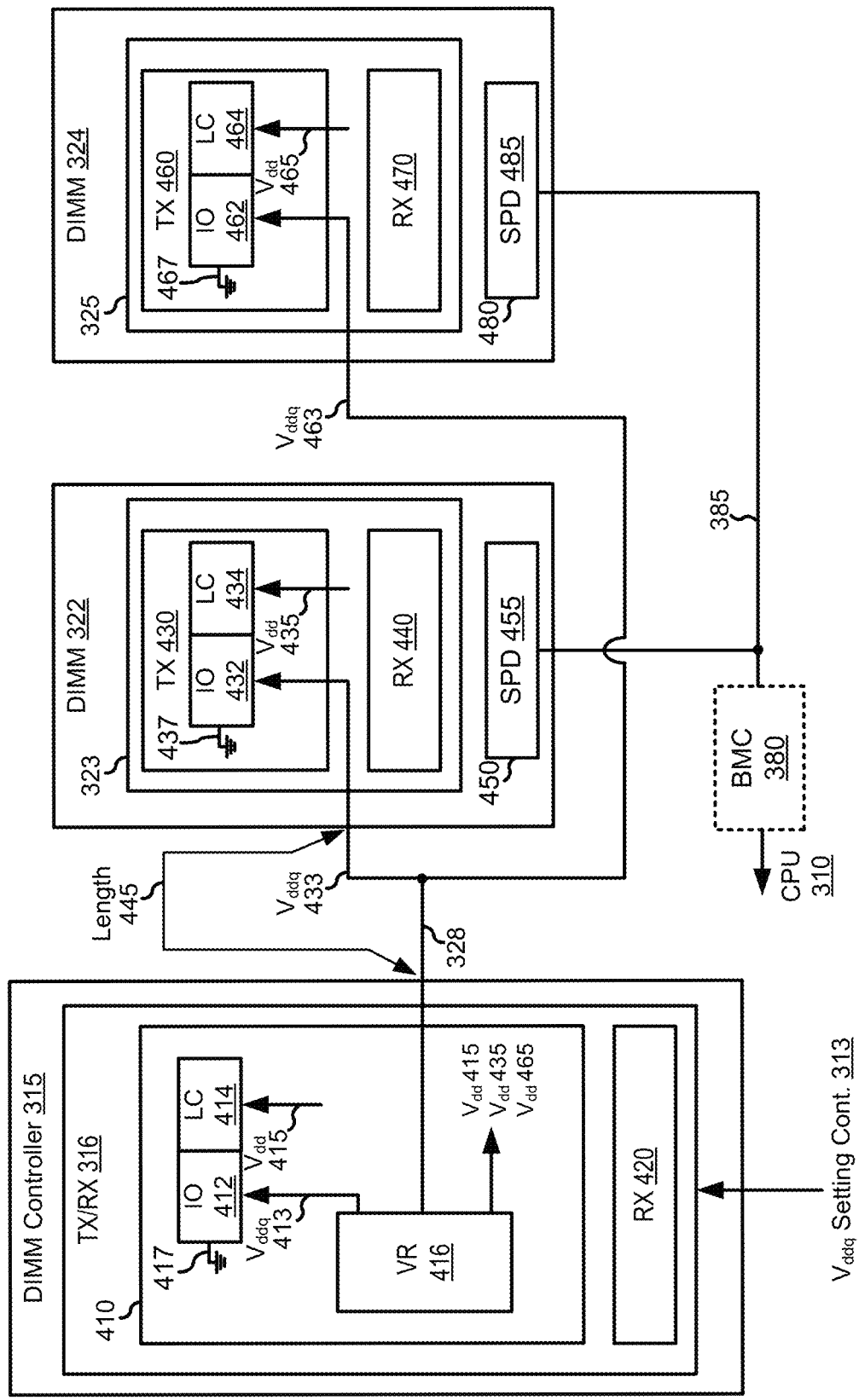
FIG. 4 illustrates a portion of the memory system including a voltage regulator according to an embodiment of the present disclosure.

FIG. 4 shows a block diagram 400 of the DIMM controller 315 including the first TX/RX 316 that is connected to the first DIMM 322 and the second DIMM 324 through the first communication channel 328. The first TX/RX 316 may include a first transmitter component (TX) 410 and a first receiver component (RX) 420 for bidirectional communications with the first DIMM 322 and/or second DIMM 324. That is, the transmission of data by the CPU 310 to the DIMM may represent one half of a bi-directional serial data link for communicating data while the data transfer by the DIMM back to the CPU can represent the other half of the bi-directional data link. The first TX 410 may include a first TX IO voltage 412, a logic circuit 414, and a voltage regulator (VR) 416. The VR 416 may be coupled to the first TX IO voltage 412 and the logic circuit 414 through a first voltage rail 413 and a second voltage rail 415, respectively. The first voltage rail 413 may be separate from the second voltage rail 415 and can utilize a ground 417 as a reference. The first voltage rail 413 and the second voltage rail 415 may be connected to the VR 416 that can receive configuration signals from the $V_{ddq}$ setting controller 313. The RX 420 may include receiver modules such as a continuous time linear equalization (CTLE), an automatic gain control (AGC), and decision feedback equalization (DFE) modules. Further information on the details and operation of the CTLE, AGC, DFE, and other transmitter modules such as a de-emphasis module in a high speed serial channel may be found in U.S. Pat. No. 10,298,421, which is incorporated herein by reference in its entirety.

The first DIMM 322 may include a second TX 430, a second RX 440, and a SPD hub 450. The second TX 430 may include a transmitter IO voltage 432 and a logic circuit 434 that can be coupled to the VR 416 through a first voltage rail 433 and a second voltage rail 435, respectively. The first voltage rail 433 may be separate from the second voltage rail 435 and can utilize a ground 437 as a reference. The first voltage rail 433 and the second voltage rail 435 may be connected to the VR 416. The second RX 440 may include receiver modules such as the CTLE, AGC, and DFE modules. A trace length 445 may include a physical length of the communication channel 328 that connects the CPU 310 to the first DIMM 322.

The second DIMM 324 may include a third TX 460, a third RX 470, and a SPD hub 480. The third TX 460 may include a transmitter IO voltage 462 and a logic circuit 464 that can be coupled to the VR 416 through a first voltage rail 463 and a second voltage rail 465, respectively. The first voltage rail 463 may be separate from the second voltage rail 465 and can utilize a ground 467 as a reference. The first voltage rail 463 and the second voltage rail 465 may be connected to output of the VR 416. The first voltage rail 463 of the second DIMM 324 may be couple to the first voltage rail 433 of the first DIMM 322. The third RX 470 may include receiver modules such as the CTLE, AGC, and DFE modules. Communications between the CPU 310 and the first and second DIMMs may be according to the double data rate fourth-generation (DDR4) standard, double data rate fifth-generation (DDR5) standard, or variants thereof.

The SPD hub 450 may be an erasable programmable read-only memory (EPROM) or other non-volatile memory that stores SPD information 455 for the first DIMM 322. Similarly, the SPD hub 480 may be an EPROM or other non-volatile memory that stores SPD information 485 for the second DIMM 324. The BMC 380 may be connected to SPD hubs 450 and 480 through the channel 385. The BMC 380 may access the SPD information for the first DIMM 322 and the second DIMM 324 in SPD hubs 450 and 480, respectively, and provide the obtained SPD information to the CPU 310 and particularly, the BIOS 312. With the obtained SPD information, the BIOS 312 and/or the DIMM controller 315 may configure each TX of the first TX/RX 316, first DIMM 322, and the second DIMM 324 to provide a desired equalization of the communication channel 328 based on the individual SPD information. For example, the SPD information may indicate the IO voltage rating, loading capacity, DIMM type, and other DIMM properties.

As an operation overview, the BIOS 312 may use a look-up table (LUT) to configure amounts of $V_{ddq}$ 413, $V_{ddq}$ 433, and $V_{ddq}$ 463 to be supplied by the VR 416 for data transmission. For example, the BIOS 312 may receive VR identification, DIMM characteristics, DIMM equalization settings, and the like, and the BIOS can utilize the LUT to set up the different outputs of the VR 416. In this example, the VR different outputs may provide the unique $V_{ddq}$ setting for each one of the $V_{ddq}$ 413, $V_{ddq}$ 433, and $V_{ddq}$ 463. In other embodiments, the BIOS 312 may use a trace length threshold for setting up the amount of $V_{ddq}$ to be supplied by the VR 416 during the data transfer. The trace length threshold may be based upon the default amount of TX $V_{ddq}$ that can allow the receiving RX to optimally acquire the signal. By using the trace length threshold as a reference, the BIOS 312 may decrease the amount of $V_{ddq}$ to be supplied by the VR 416 during the data transfer when the connecting communication channel length is lesser than or equal to the trace length threshold. Similarly, the BIOS 312 may increase the amount of $V_{ddq}$ to be supplied by the VR 416 when the connecting communication channel length is greater than the trace length threshold. For example, the BIOS 312 may use a two inch trace length threshold that corresponds to 1150 mV default $V_{ddq}$. In this example and for the data transfer between the CPU 310 and the first DIMM 322, the BIOS 312 may decrease the amount of $V_{ddq}$ to about 950 mV to 1000 mV when the trace length 445 is equal to or less than the two inch trace length threshold. The decrease in the amount of $V_{ddq}$ may generate power savings of 10s to 100s Of mW per communication channel and furthermore, the power savings does not create significant impact on optimum eye width and/or eye height of the received signal. In these embodiments, the VR 416 may supply the same amount of $V_{dd}$ on the voltage rails 415, 435, and 465. In some cases, another VR or voltage source that is located outside of the memory system may supply the $V_{dd}$.

In an embodiment, the BIOS 312 may configure the settings of each VR in the DIMM controller 315 during initialization of the information handling system or upon connecting of the DIMM to the CPU 310. In this embodiment, the BIOS 312 may configure the different amounts of $V_{ddq}$ to be supplied by each VR based upon a predetermined trace length of the connecting communication channel. For example and in the case of data transfer between the CPU 310 and the first DIMM 322, the BIOS 312 may configure the settings of the VR 416 based on the trace length 445 of the connecting communication channel 328. In this example, the VR 416 may be configured to supply desired amounts of $V_{ddq}$ through the $V_{ddq}$ 413 and $V_{ddq}$ 433 of the first TX 410 and the second TX 430, respectively. The $V_{ddq}$ from the $V_{ddq}$ 413 may be used for data transmission from the first TX 410 to the first DIMM 322 while the $V_{ddq}$ through the $V_{ddq}$ 433 can be used for data transfer by the first DIMM 322 to the first TX 410. In some cases, the VR 416 may be configured to supply the same amount of $V_{ddq}$ to the first DIMM 322 and the second DIMM 324.

The VR 416 may include a voltage source that can provide different amount of output voltages. The VR 416 may convert an input voltage to a desired voltage. For example, the VR 416 may step-down an input voltage of 5 V to about 1.1V $V_{ddq}$ for DDR5. The VR 416 may be configured to supply voltages to the first TX IO voltage 412 and the first TX logic circuit 414 over different voltage rails. The first voltage rail 413 may supply the $V_{ddq}$ from the VR 416 to the first TX IO voltage 412. The IO voltage 412 may include the data bus IO pin that can connect to output buffers of the first TX 410. In an embodiment, the first voltage rail 413 is referenced to the ground terminal 427. In this case, the VR 416 may independently supply the ground referenced $V_{ddq}$ to the IO voltage 412 based on the settings as configured by the BIOS. The second voltage rail 415 may supply a logic circuit voltage ($V_{dd}$) from the VR 416 to the first TX logic circuit 414. The logic circuit 414 may include the internal logic core pin that can connect to input buffers of the first TX 410. In an embodiment, the second voltage rail 415 is referenced to the ground terminal 417. In this case, the VR 416 may independently supply the ground referenced $V_{dd}$ to the logic circuit 414. That is, the VR 416 may separately control the amount of $V_{ddq}$ and $V_{dd}$ to be supplied to the IO voltage 412 and logic circuit 414, respectively. In some embodiments, the amount of $V_{dd}$ that may be supplied by the VR 416 can include a fixed voltage value. That is, the logic circuits 414, 434, and 464 may receive the same amount of $V_{dd}$ from the VR 416.

The VR 416 may also supply voltages to the second TX IO voltage 432 and the second TX logic circuit 434 over different voltage rails. The first voltage rail 433 may supply the $V_{ddq}$ from the VR 416 to the second TX IO voltage 432. The second TX IO voltage 432 may include the data bus IO pin that can connect to output buffers of the second TX 430. In an embodiment, the first voltage rail 433 is referenced to the ground terminal 437. In this embodiment, the VR 416 may independently supply the ground referenced $V_{ddq}$ to the IO voltage 432 based on the settings as configured by the BIOS. The second voltage rail 435 may supply the $V_{dd}$ from the VR 416 to the second TX logic circuit 434. The logic circuit 434 may include the internal logic core pin that can connect to input buffers of the second TX 430. In an embodiment, the second voltage rail 415 is referenced to the ground terminal 437. In this embodiment, the VR 416 may independently supply the ground referenced $V_{dd}$ to the logic circuit 434. That is, the VR 416 may separately control the amount of $V_{ddq}$ and $V_{dd}$ to be supplied to the IO voltage 432 and logic circuit 434, respectively.

The VR 416 may similarly supply voltages to the third TX IO voltage 462 and the third TX logic circuit 464 over different voltage rails. The first voltage rail 463 may supply the $V_{ddq}$ from the VR 416 to the third TX IO voltage 462. The third TX IO voltage 462 may include the data bus IO pin that can connect to output buffers of the third TX 460. In an embodiment, the first voltage rail 463 is referenced to the ground terminal 467. In this embodiment, the VR 416 may independently supply the ground referenced $V_{ddq}$ to the IO voltage 462 based on the settings as configured by the BIOS.

The second voltage rail 465 may supply the $V_{dd}$ from the VR 416 to the third TX logic circuit 464. The logic circuit 464 may include the internal logic core pin that can connect to input buffers of the third TX 460. In an embodiment, the second voltage rail 415 is referenced to the ground terminal 467. In this embodiment, the VR 416 may independently supply the ground referenced $V_{dd}$ to the logic circuit 464. That is, the VR 416 may separately control the amount of $V_{ddq}$ and $V_{dd}$ to be supplied to the IO voltage 462 and logic circuit 464, respectively.

In an embodiment, the BIOS 312 may utilize the default amount of $V_{ddq}$ as a reference for the adjustments of the $V_{ddq}$ to be supplied the VR 416. The reference default amount of $V_{ddq}$ may correspond to a particular trace length threshold that can be used as a comparison reference for each of the connecting communication channel. In this embodiment, the amount of $V_{ddq}$ to be used by the first TX 410, second TX 430, or the third TX 460 may be based upon the trace length 445 of the communication channel 328. In another embodiment, the adjustments of the $V_{ddq}$ may be combined with configured equalization settings in the receiving device. In this other embodiment, the BIOS 312 may utilize equalization settings in the RX to compensate for signal losses. For example and for data transfer from the CPU 310 to the first DIMM 322, the communication channel 328 is lesser than the particular trace length threshold and in this regard, a maximized reduction of the $V_{ddq}$ may be configured for the first TX IO voltage 412. In this example, the maximized reduction of the $V_{ddq}$ in the IO voltage 412 may not generate the optimum eye width and/or eye height of the received signal at the second RX 440. As such, the BIOS 312 may utilize the equalization settings of the second RX 440 to compensate for the signal losses. In another example and for data transfer from the CPU 310 to the first DIMM 322, the loading in the receiving DIMM may affect the receiving of the signal that was transmitted using a reduced amount of the $V_{ddq}$. In this other example, the BIOS 312 may utilize the equalization settings of the second RX 440 to compensate for the loading in the DIMM.

In some embodiments, the BIOS 312 may use the LUT to configure amounts $V_{ddq}$ to be supplied by the VR 416. In this embodiment, the BIOS 312 may similarly leverage equalization settings of the receiving device, RX loading, and the like.

Figure 5:
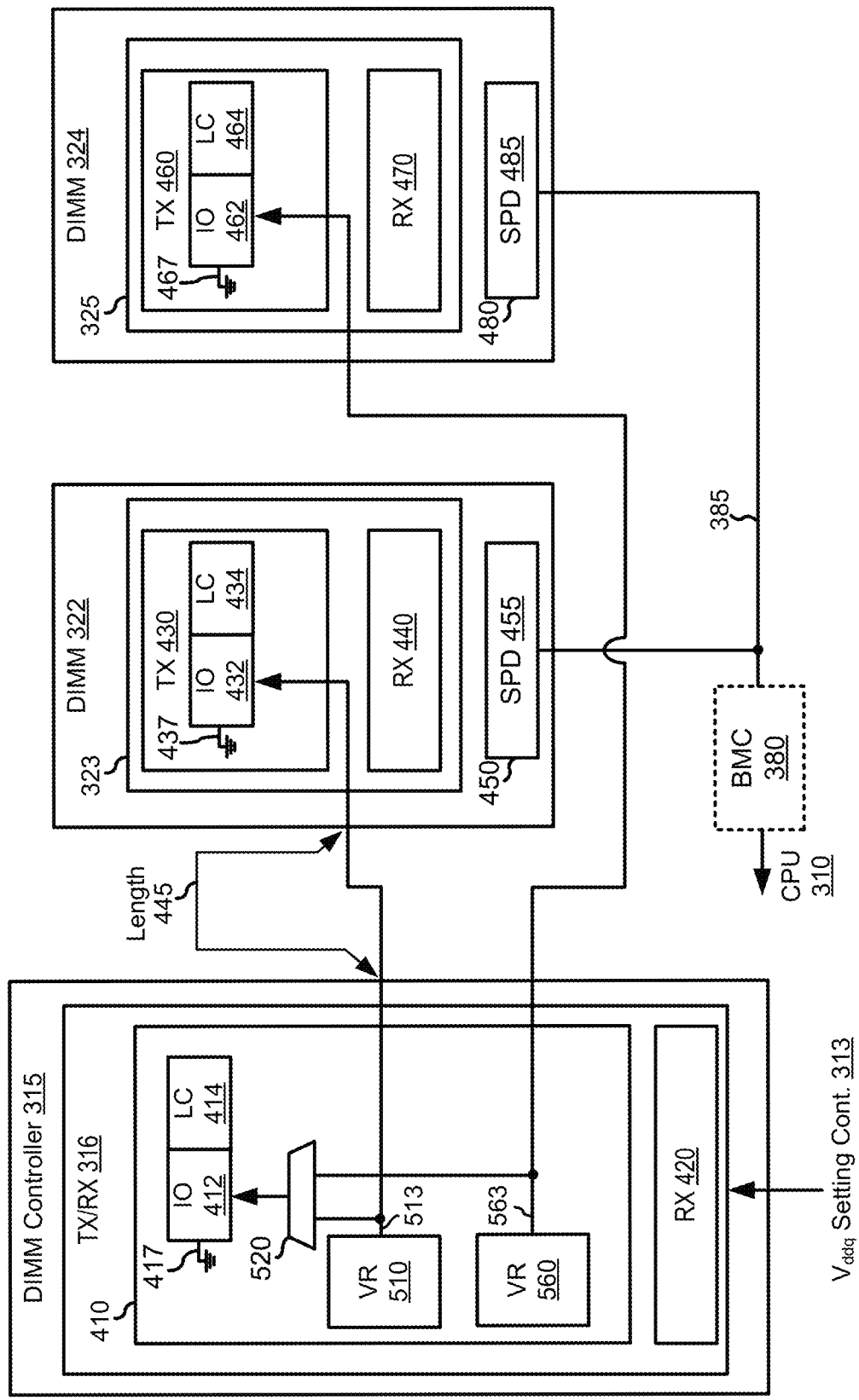
FIG. 5 illustrates a portion of the memory system including a separate voltage regulator for each associated dual in-line memory module (DIMM) according to an embodiment of the present disclosure.

FIG. 5 shows a block diagram 500 of the DIMM controller TX/RX 316 including a dedicated VR for each one of the associated DIMMs. The dedicated VR includes a first VR 510 and a second VR 560 that are configured to support the first DIMM 322 and the second DIMM 324, respectively. When supplying $V_{ddq}$ to the first TX IO voltage 412, a multiplexer (MUX) 520 may be used to select the $V_{ddq}$ that is coming from the first VR 510 or the second VR 560.

In an embodiment, the first VR 510 may be configured by the $V_{ddq}$ setting controller 313 to supply the set amount of $V_{ddq}$ to the first TX IO voltage 412 through the MUX 520 and to the second TX IO voltage 432 through a first voltage rail 513. The set amount of $V_{ddq}$ may be used for bidirectional communications between the DIMM controller 315 and the first DIMM 322. Similarly, the second VR 560 may be configured by the $V_{ddq}$ setting controller 313 to supply the unique amount of $V_{ddq}$ to the first TX IO voltage 412 through the MUX 520 and to the third TX IO voltage 462 through a first voltage rail 563. The unique amount of $V_{ddq}$ may be used for bidirectional communications between the DIMM controller 315 and the second DIMM 324. In this embodiment, the voltage rails 513 and 563 may be referenced to the ground terminal.

During initialization, the $V_{ddq}$ setting controller 313 may configure separately and independently the settings of the first VR 510 from the second VR 560. That is, the first VR 510 may be configured to supply desired voltages for bidirectional communications between the DIMM controller 315 and the first DIMM 322 while the second VR 560 can be set to supply the necessary voltages for bidirectional communications between the DIMM controller 315 and the second DIMM 324. In this case, each one of the first VR 510 and the second VR 560 may include a fixed setting for the corresponding bidirectional communications.

Figure 6:
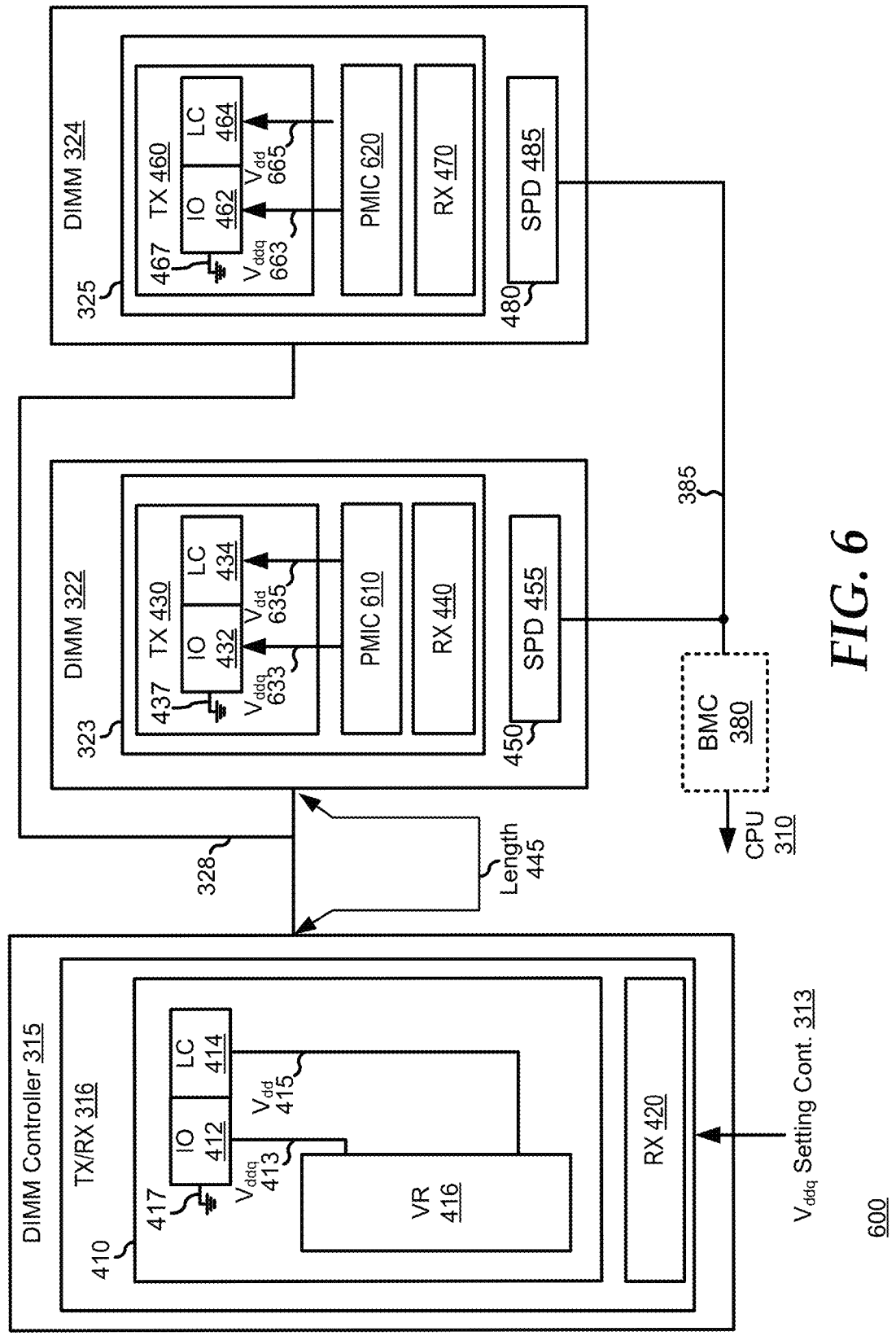
FIG. 6 illustrates a portion of the memory system including the voltage regulator in each associated DIMM according to an embodiment of the present disclosure.

FIG. 6 shows a block diagram 600 of the DIMM controller 315 including the first TX/RX 316 that is connected to the first DIMM 322 and the second DIMM 324 through the first communication channel 328. In an embodiment, the first DIMM 322 may include a first PMIC 610 while the second DIMM 324 includes a second PMIC 620. In this embodiment, the BIOS 312 through the $V_{ddq}$ setting controller 313 may configure each of the VR 416, PMIC 610, and PMIC 620 to include a unique $V_{ddq}$ setting for power optimization.

The PMIC 610 may include a voltage source that can convert an input voltage supply to different output voltages. For example, the PMIC 610 may step-down the input voltage of 12 V to about 1.1V for DDR5. The PMIC 610 may be configured to supply voltages to the second TX IO voltage 432 and to the second TX logic circuit 434 over different voltage rails. A first voltage rail 633 may supply the $V_{ddq}$ from the PMIC 610 to the second TX IO voltage 432 while a second voltage rail 635 may supply the $V_{dd}$ from the PMIC 610 to the second TX logic circuit 434. Similar to the VR 416, the PMIC 610 may independently supply the ground referenced $V_{ddq}$ to the IO voltage 432 based on the settings as configured by the BIOS. Furthermore, the PMIC 610 may separately control the amount of $V_{ddq}$ and $V_{dd}$ to be supplied to the IO voltage 432 and logic circuit 434, respectively. The first voltage rail 633 and the second voltage rail 635 are similar to the first voltage rail 433 and the second voltage rail 435, respectively.

The PMIC 620 may include similar functions as that of the PMIC 610. That is, the PMIC 620 may be configured to supply voltages to the third TX IO voltage 462 and the third TX logic circuit 464 over different voltage rails. A first voltage rail 663 may supply the $V_{ddq}$ from the PMIC 620 to the third TX IO voltage 462 while a second voltage rail 665 may supply the $V_{dd}$ from the PMIC 620 to the third TX logic circuit 464 based on the settings as configured by the BIOS. In an embodiment, the PMIC 620 may be configured to separately control the amount of $V_{ddq}$ and $V_{dd}$ to be supplied to the IO voltage 462 and logic circuit 464, respectively. The first voltage rail 663 and the second voltage rail 665 are similar to the first voltage rail 463 and the second voltage rail 465, respectively.

Figure 7:
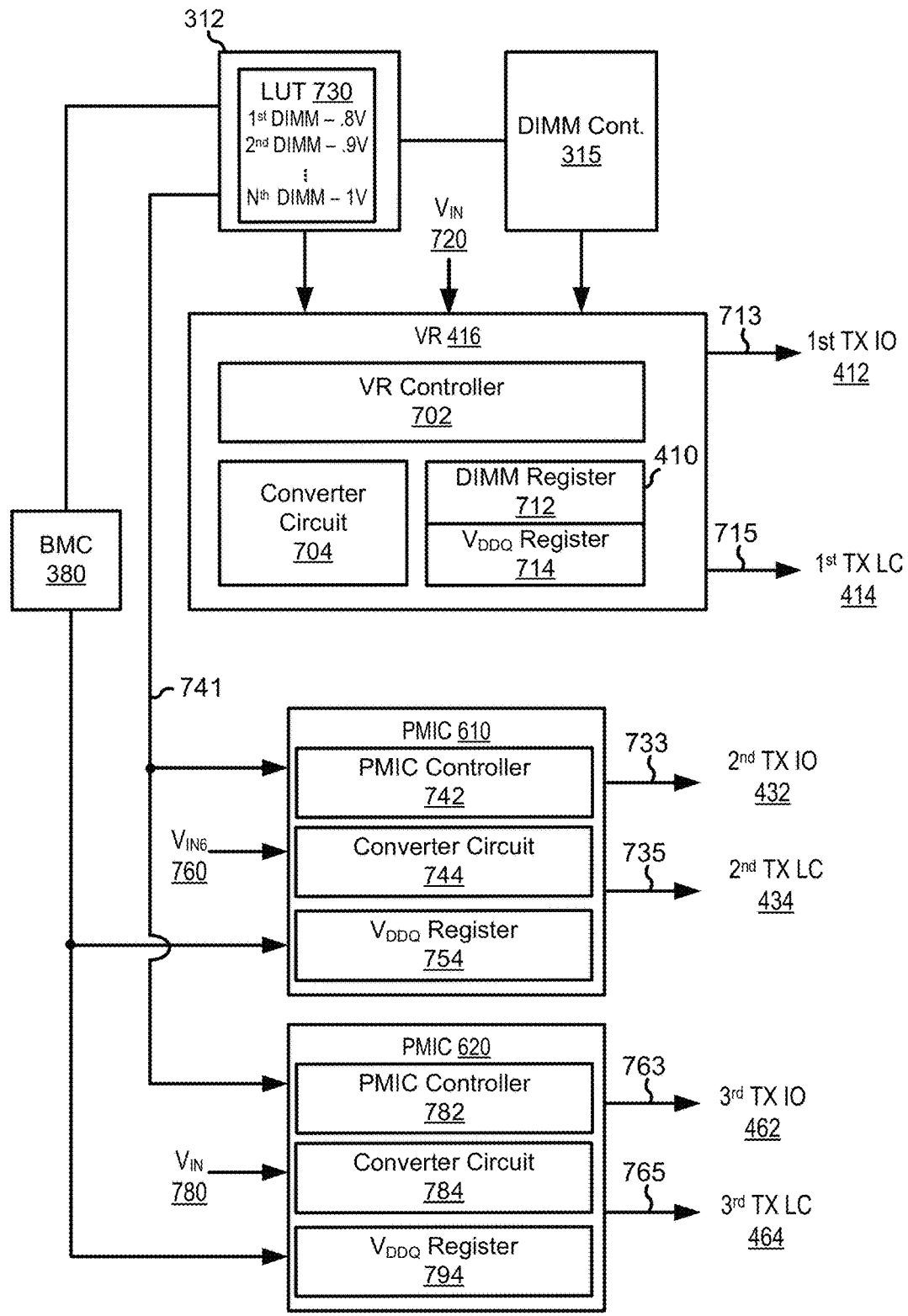
FIG. 7 illustrates an information handling system including generation of voltages according to an embodiment of the present disclosure.

FIG. 7 shows a block diagram 700 of the VR 416 and the PMICs 610 and 620 that may be configured by the BIOS 312 through utilization of a LUT. In an embodiment, the VR 416 may receive control signals directly or indirectly from the BIOS 312, BMC 380, or the DIMM controller 315. The control signals may set up the amount of $V_{ddq}$ and $V_{dd}$ to be supplied by the VR 416. The VR 416 may include a VR controller 702, a converter circuit 704, and a VR register 710 including a DIMM register 712 and a $V_{ddq}$ register 714. The VR 416 may receive an input voltage 720 and the VR 416 converts the input voltage into variable amount of output voltages. In some cases, the VR 416 may supply the $V_{ddq}$ and $V_{dd}$ to each TX/RX and the associated DIMMs in the memory system. In other cases where each DIMM includes its own PMIC, the VR 416 may be limited to supply the $V_{ddq}$ and $V_{dd}$ to the TX/RX that the VR 416 is associated with. For example and based upon the setting configured by the BIOS 312 on the VR 416, the VR 416 may supply the $V_{ddq}$ to the first TX IO 412 through a first voltage rail 713. The VR 416 may similarly supply the $V_{dd}$ to the first TX logic circuit 414 through a separate second voltage rail 715. The first voltage rail 713 and the second voltage rail 715 are similar to the first voltage rail 413 and the second voltage rail 415, respectively.

In an embodiment, The BIOS 312 may utilize a LUT 730 to configure the settings of the VR 416. The LUT 730 may include a preconfigured amount of $V_{ddq}$ to be generated by the VR 416. In the case where the VR 416 supplies the $V_{ddq}$ to associated DIMM, the preconfigured amount of $V_{ddq}$ and the corresponding DIMM may be stored in the $V_{ddq}$ register 714 and the DIMM register 712, respectively. In some cases, the LUT 730 may store VR, PMIC, and/or DIMM identifications and the corresponding preconfigured amount of $V_{ddq}$ to be used by each VR, PMIC, or DIMM.

The PMIC 610 may include a PMIC controller 742, a converter circuit 744, and a $V_{ddq}$ register 754. The PMIC 610 may receive an input signal 760 and converts the input signal into desired amounts of $V_{ddq}$ and $V_{dd}$ that are supplied through a first voltage rail 733 and a second voltage rail 735, respectively. In an embodiment, the PMIC 610 may receive control signals from the BIOS 312 through a link 741. The control signals may include desired configurations of the PMIC 610. For example, the PMIC controller 742 may receive a setting of 0.8 V for the second TX IO 432. In this example, the $V_{ddq}$ register 754 may store the 0.8 V and the converter circuit 744 may generate the 0.8 V at the first voltage rail 733. In this example, the PMIC controller 742 may control operations of the converter circuit 744 and the $V_{ddq}$ register 754. In another embodiment, the control signals may be received from the BMC 380. In this other embodiment, the BMC 380 may receive instructions from a remote management controller or from the BIOS 312. For either case, the PMIC controller 742 may receive the configured setting for the second TX IO 432; store the setting at the $V_{ddq}$ register 754; and configures the converter circuit 744 to generate the desired voltages.

The PMIC 620 may include a PMIC controller 782, a converter circuit 784, and a $V_{ddq}$ register 794. The PMIC 620 may receive an input signal 780 and converts the input signal into desired amounts of $V_{ddq}$ and $V_{dd}$ that are supplied through a first voltage rail 763 and a second voltage rail 765, respectively. In an embodiment, the PMIC 620 may receive control signals from the BIOS 312 through the link 741. The control signals may include desired configurations of the PMIC 620. For example, the PMIC controller 782 may receive a setting of 0.9 V for the third TX IO 462. In this example, the $V_{ddq}$ register 794 may store the 0.9 V and the converter circuit 784 may generate the 0.9 V at the first voltage rail 763. In this example, the PMIC controller 782 may control operations of the converter circuit 784 and the $V_{ddq}$ register 794. In another embodiment, the control signals may be received from the BMC 380. In this other embodiment, the BMC 380 may receive instructions from the remote management controller or from the BIOS 312. For either case, the PMIC controller 782 may receive the configured setting for the third TX IO 462; store the setting at the $V_{ddq}$ register 794; and configures the converter circuit 784 to generate the desired voltages.

In an embodiment, the LUT 730 may include VR, PMIC, and DIMM identifications and the preconfigured amount of $V_{ddq}$. For example and during initialization, the BIOS 312 may detect N number of DIMMs where N includes an integer value. In this example, the BIOS 312 may use the LUT 730 to configure the PMIC in each one of the N DIMMs. In this embodiment, each PMIC may independently supply the configured $V_{ddq}$ to the corresponding data bus IO pins.

Figure 8:
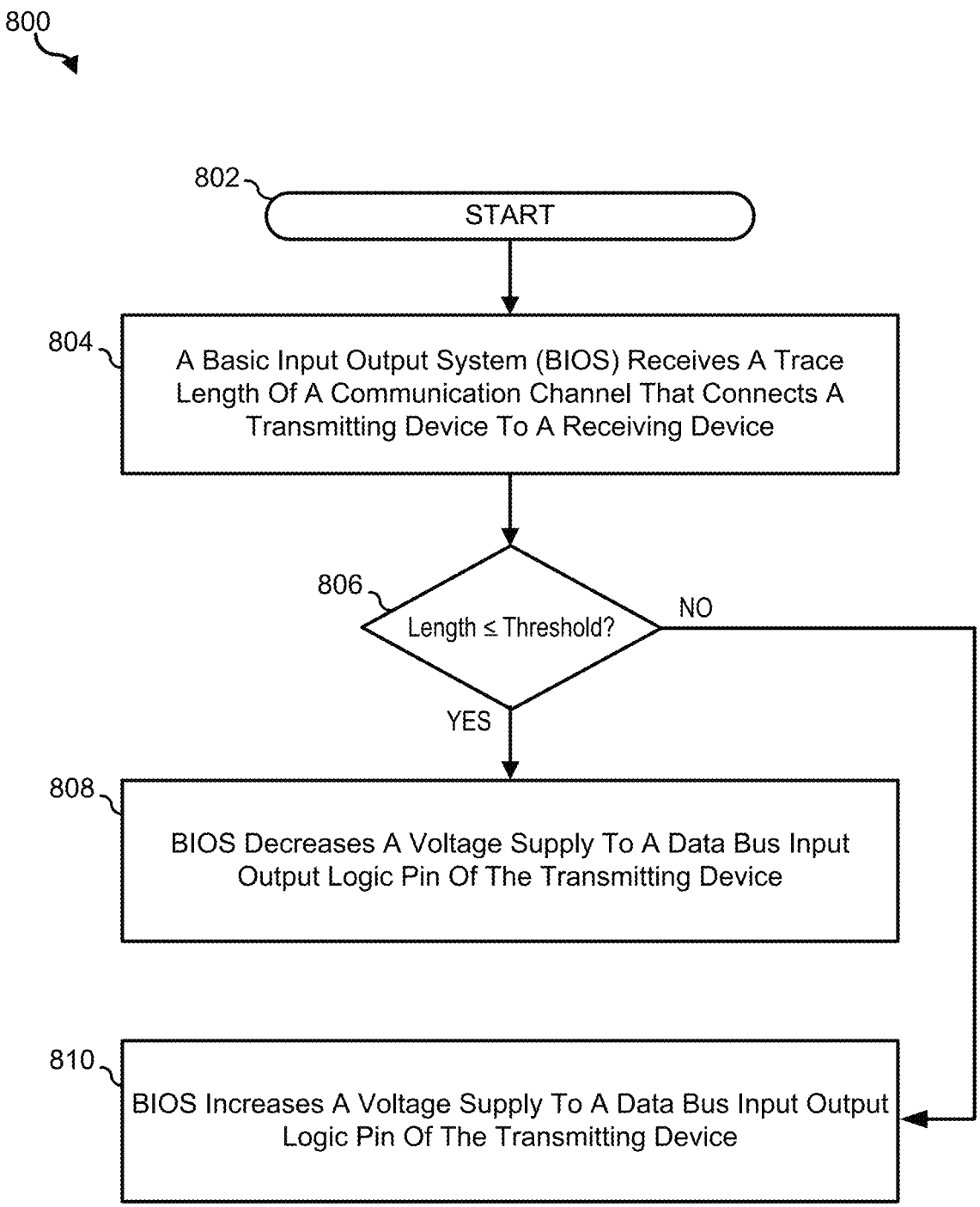
FIG. 8 is a flowchart showing a method for increasing power efficiency in the memory system according to an embodiment of the present disclosure.

FIG. 8 shows a flowchart of a process 800 for setting variable IO voltages based on a trace length threshold, starting at block 802. At block 804, the BIOS receives a trace length measurement of the communication channel that connects a transmitting device to a receiving device. For example, the transmitting device includes the CPU 310 while the receiving device includes the first DIMM 322. In this example, the BIOS may receive measurements of the trace length 445 through platform specific trace length tables store in the system BIOS 312 or within BMC 380. At block 806, the BIOS 312 may compare the received trace length to a trace length threshold value that includes a conductive trace length associated with the default $V_{ddq}$. In a case where the received trace length is equal or lesser than the threshold value, then at block 808, the BIOS decreases the amount of $V_{ddq}$ to be supplied by the VR or the PMIC to the data bus IO pin driver. Otherwise, at block 810, the BIOS may increase the amount of $V_{ddq}$ to overcome signal losses due to extended trace length of the communication channel. In an embodiment, the amount of increase or decrease from the default $V_{ddq}$ Setting may be determined as a function of the received trace length, the difference between the received trace length and the trace length threshold, proportional to the difference between the received trace length and the trace length threshold, or any other suitable means.

In another embodiment, the BIOS may characterize and determine the trace length of each communication channel that connects to the DIMM by using suitable circuitry in the transmitter and receiver PHYs using methods known in the state of the art. For example, the BIOS 312 may determine the trace length 445 of the first communication channel 328 between the DIMM controller 315 and the first DIMM 322. In this other embodiment, the BIOS 312 may configure the $V_{ddq}$ to be supplied by the VR or the PMIC based upon the determined trace length measurements between the transmitting device and the receiving device.

In some embodiments, the BIOS 312 may further configure the $V_{ddq}$ to be supplied by the VR or the PMIC based upon the equalization settings of the receiving device. For example, the equalization settings of the second RX 440 of the receiving first DIMM 322 may utilize a smaller voltage gain. In this example, the $V_{ddq}$ may be limited by the amount of voltage gain in the equalization settings of the receiving first DIMM 322.

Figure 9:
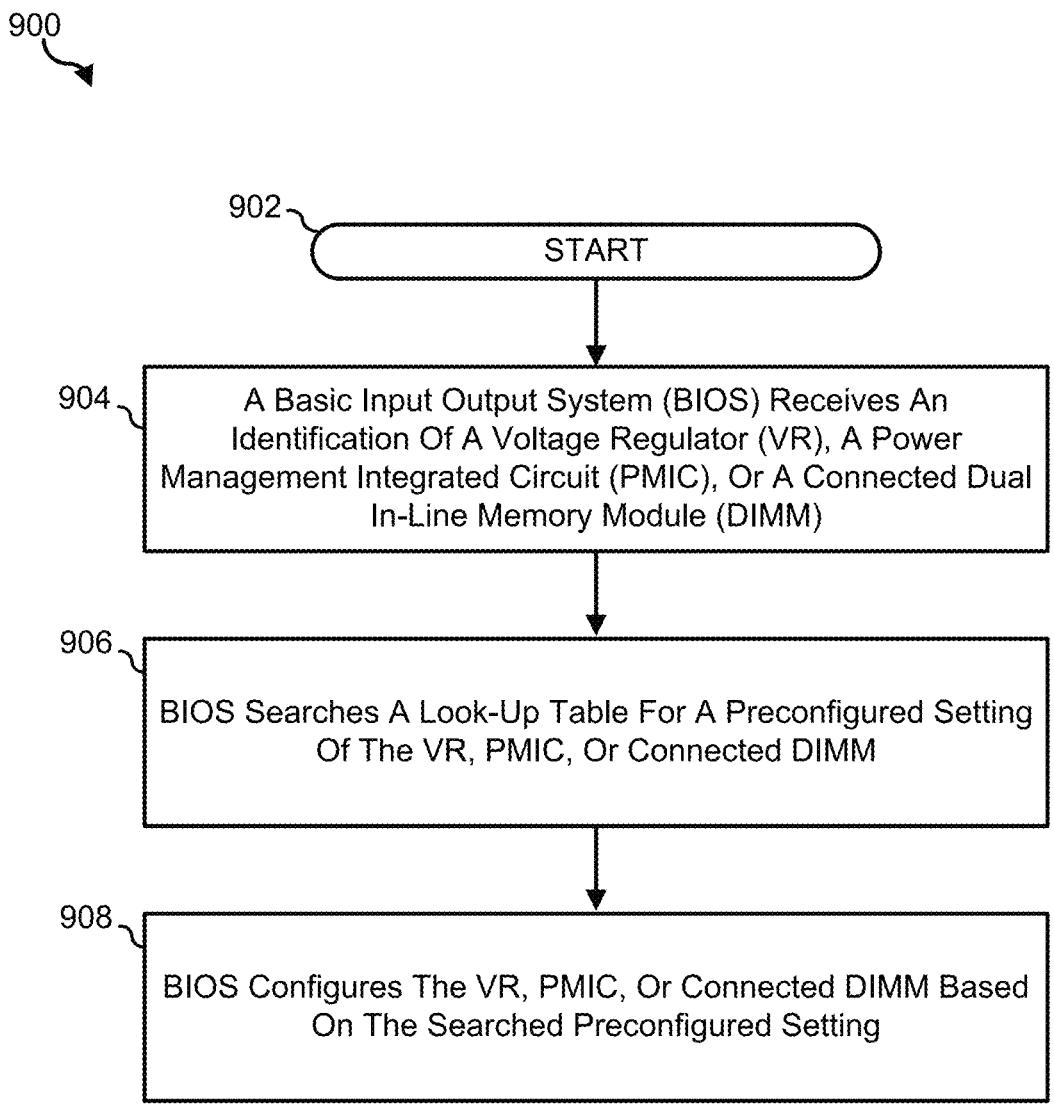
FIG. 9 is a flowchart showing a method for increasing power efficiency in the memory system according to an embodiment of the present disclosure.

FIG. 9 shows a flowchart of a process 900 for setting the variable IO voltages based on preconfigured amount of $V_{ddq}$ to be used by each VR or PMIC, starting at block 902. At block 904, the BIOS receives an identification of the VR, PMIC, or the connected DIMM. At block 906, the BIOS searches the LUT 730 for preconfigured settings of the VR, PMIC, or connected DIMM based on their corresponding identification. At block 908, the BIOS may configure the VR, PMIC or the connected DIMM based upon the searched preconfigured settings.

Figure 10:
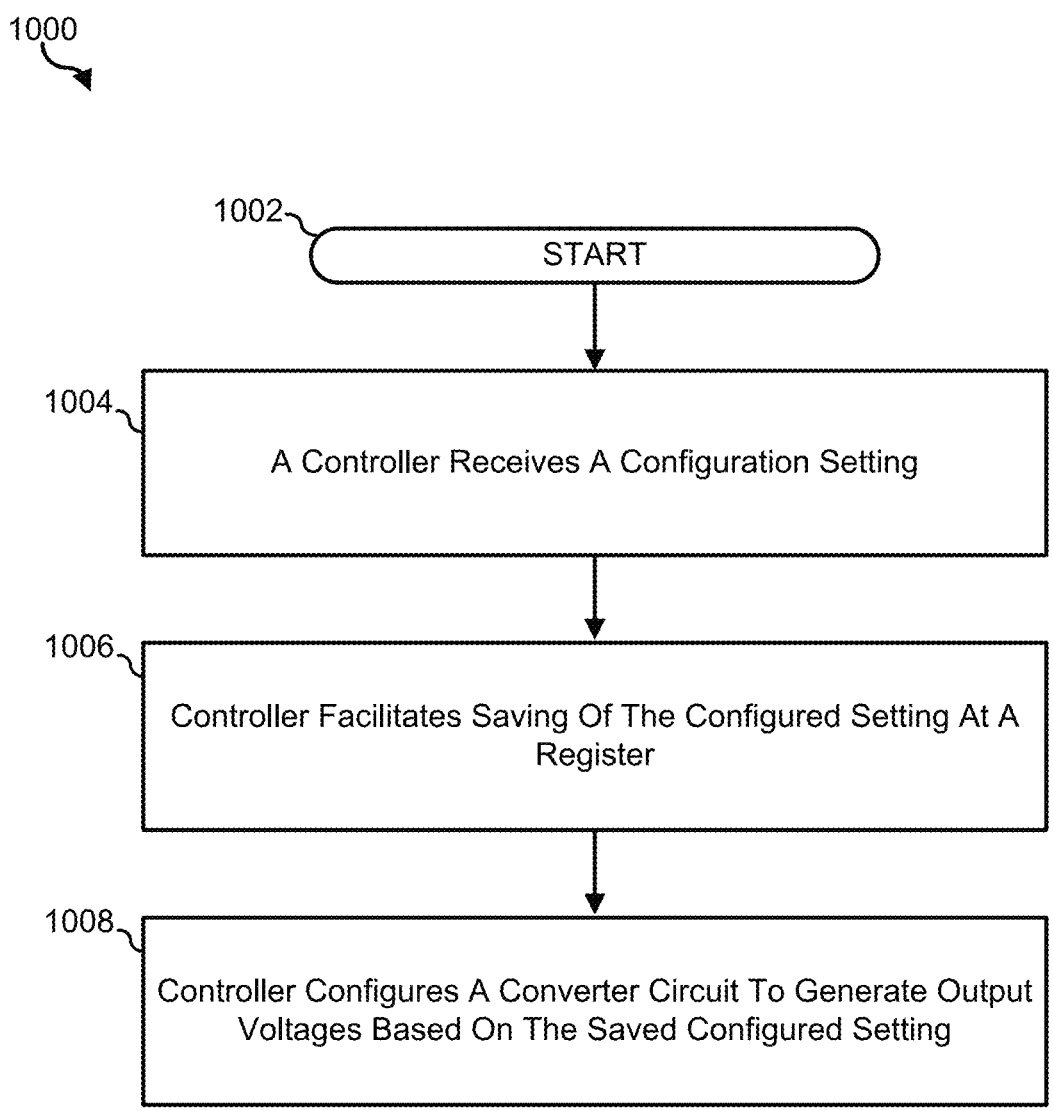
FIG. 10 is a flowchart showing a method for increasing power efficiency in the DIMM according to an embodiment of the present disclosure.

FIG. 10 shows a flowchart of a process 1000 for setting of the variable IO voltages in the VR or PMIC, starting at block 1002. At block 1004, a controller receives a configuration setting. For example, the controller includes the VR controller 702 or the PMIC controller 742 or 782. In this example, the setting may be received from the BIOS or from the BMC. At block 1006, the controller facilitates the saving of the received configuration at the register. For example, the register includes one of the $V_{ddq}$ registers 714, 754, and 794. At block 1008, the controller may configure the converter circuit to generate the corresponding amounts of $V_{ddq}$ based from the stored setting in the $V_{ddq}$ register.

Processes 800-1000 may be performed at the initialization of the information handling system or upon connecting one or more DIMMs to the CPU. Thus there may be dynamic and individual setting of $V_{ddq}$ for individual communication channels.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function, and equivalents thereof.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest reasonable interpretation of the following claims and their equivalents, and shall not be restricted or limited by the foregoing detailed description.

What is claimed is:

1. An information handling system having improved power efficiency, comprising:
   a processing unit including a dual in-line memory module (DIMM) controller and configured to host a basic input output system (BIOS);
   a first set of DIMMs that are connected to the DIMM controller by a first communication channel; and
   a second set of DIMMs that are connected to the DIMM controller by a second communication channel,
   wherein the BIOS is configured to provide a unique data bus input output voltage ($V_{ddq}$) setting for bidirectional communications between each DIMM in the first and second sets of DIMMs and the processing unit, wherein the DIMM controller is configured to supply a particular amount of $V_{ddq}$ to each DIMM based on the provided unique $V_{ddq}$ setting, wherein the particular amount of $V_{ddq}$ varies from a default amount of $V_{ddq}$ based on whether a channel length between the DIMM controller and a corresponding DIMM is greater than or less than a trace length threshold.

2. The information handling system of claim 1, wherein the DIMM controller includes a first transceiver (TX/RX) with a first voltage regulator (VR) and a second TX/RX with a second VR, wherein the first TX/RX and the second TX/RX are connected to the first set of DIMMs and to the second set of DIMMs, respectively, through the corresponding first communication channel and second communication channel.

3. The information handling system of claim 2, wherein the first VR is configured to supply the particular amount of $V_{ddq}$ to a data bus input output (IO) pin of the first TX/RX and to a data bus IO pin of each DIMM in the first set of DIMMs.

4. The information handling system of claim 2, wherein the second VR is configured to supply the particular amount of $V_{ddq}$ to a data bus input output (IO) pin of the second TX/RX and to a data bus IO pin of each DIMM in the second set of DIMMs.

5. The information handling system of claim 1, wherein the $V_{ddq}$ is referenced to a ground terminal.

6. The information handling system of claim 1 further comprising a baseband management controller that is configured to obtain a DIMM serial presence detect (SPD) information from each DIMM in the first and second set of DIMMs.

7. The information handling system of claim 6, wherein the unique $V_{ddq}$ setting for each DIMM is based on the obtained SPD information of the DIMM.

8. The information handling system of claim 1, wherein the BIOS receives an identification of a voltage regulator that is configured to supply the particular amount of $V_{ddq}$.

9. The information handling system of claim 8, wherein the BIOS utilizes a look-up table to generate the unique $V_{ddq}$ setting based on the received identification.

10. The information handling system of claim 8, wherein the voltage regulator is configured to supply a logic circuit voltage to each DIMM in the first set of DIMMs and the second set of DIMMs.

11. The information handling system of claim 10, wherein the $V_{ddq}$ and the logic circuit voltage are supplied using separate voltage rails.

12. A method, comprising:
hosting, by a processing unit, a basic input output system (BIOS), wherein the processing unit includes a dual in-line memory module (DIMM) controller;
connecting a first set of DIMMs and a second set of DIMMs to the DIMM controller by a first communication channel and a second communication channel, respectively; and
providing, by the BIOS, a unique data bus input output voltage ($V_{ddq}$) setting for bidirectional communications between each DIMM in the first and second sets of DIMMs and the processing unit, wherein the DIMM controller is configured to supply a particular amount of $V_{ddq}$ to each DIMM based on the provided unique $V_{ddq}$ setting, wherein the particular amount of $V_{ddq}$ varies from a default amount of $V_{ddq}$ based on whether a channel length between the DIMM controller and a corresponding DIMM is greater than or less than a trace length threshold.

13. The method of claim 12, wherein the DIMM controller includes a first transceiver (TX/RX) with a first voltage regulator (VR) and a second TX/RX with a second VR, wherein the first TX/RX and the second TX/RX are connected to the first set of DIMMs and to the second set of DIMMs, respectively, through the corresponding first communication channel and second communication channel.

14. The method of claim 13, wherein the first VR is configured to supply the particular amount of $V_{ddq}$ to a data bus input output (IO) pin of the first TX/RX and to a data bus IO pin of each DIMM in the first set of DIMMs.

15. The method of claim 13, wherein the second VR is configured to supply the particular amount of $V_{ddq}$ to a data bus input output (IO) pin of the second TX/RX and to a data bus IO pin of each DIMM in the second set of DIMMs.

16. The method of claim 12, wherein the $V_{ddq}$ is referenced to a ground terminal.

17. The method of claim 12 further comprising: supplying, by the DIMM controller, a logic circuit voltage to each DIMM in the first set of DIMMs and the second set of DIMMs.

18. The method of claim 17, wherein the $V_{ddq}$ and the logic circuit voltage are supplied using separate voltage rails.

19. An information handling system, comprising:
a processing unit including a dual in-line memory module (DIMM) controller and configured to host a basic input output system (BIOS), wherein the DIMM controller includes a first transceiver (TX/RX) with a first voltage regulator (VR) and a second TX/RX with a second VR;
a first set of DIMMs that are connected to the first TX/RX by a first communication channel; and
a second set of DIMMs that are connected to the second TX/RX by a second communication channel,
wherein the BIOS is configured to provide a unique data bus input output voltage ($V_{ddq}$) setting for bidirectional communications between each DIMM in the first and second sets of DIMMs and the processing unit, wherein each one of the first VR and the second VR is configured to supply a particular amount of $V_{ddq}$ to each associated DIMM based on the provided unique $V_{ddq}$ setting, wherein the particular amount of $V_{ddq}$ varies from a default amount of $V_{ddq}$ based on whether a channel length between the DIMM controller and a corresponding DIMM is greater than or less than a trace length threshold.

20. The information handling system of claim 19, wherein the first VR is configured to supply the particular amount of $V_{ddq}$ to a data bus input output (IO) pin of the first TX/RX and to a data bus IO pin of each DIMM in the first set of DIMMs while the second VR is configured to supply the particular amount of $V_{ddq}$ to a data bus input output (IO) pin of the second TX/RX and to a data bus IO pin of each DIMM in the second set of DIMMs.

\* \* \* \* \*